(12) United States Patent
Maemura et al.

(10) Patent No.: US 8,141,808 B2
(45) Date of Patent: Mar. 27, 2012

(54) SEAT BELT DEVICE

(75) Inventors: Eiji Maemura, Kanagawa (JP); Susumu Nakajima, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 233 days.

(21) Appl. No.: 12/593,156

(22) PCT Filed: Mar. 26, 2008

(86) PCT No.: PCT/JP2008/055685
§ 371 (c)(1),
(2), (4) Date: Nov. 18, 2009

(87) PCT Pub. No.: WO2008/117820
PCT Pub. Date: Oct. 2, 2008

(65) Prior Publication Data
US 2010/0072313 A1 Mar. 25, 2010

(30) Foreign Application Priority Data
Mar. 26, 2007 (JP) .............................. P. 2007-078109

(51) Int. Cl.
*B65H 23/06* (2006.01)
(52) U.S. Cl. .................................................. 242/422.2
(58) Field of Classification Search ............... 242/422.2, 242/422
See application file for complete search history.

(56) References Cited

U.S. PATENT DOCUMENTS

| | | | | |
|---|---|---|---|---|
| 5,553,804 | A * | 9/1996 | Hamann | 242/382.4 |
| 6,290,160 | B1 * | 9/2001 | Strobel | 242/383 |
| 6,447,012 | B2 * | 9/2002 | Peter et al. | 280/806 |
| 7,055,775 | B2 * | 6/2006 | Peter | 242/383.1 |
| 7,080,801 | B2 * | 7/2006 | Prokscha et al. | 242/390.9 |
| 7,698,038 | B2 * | 4/2010 | Odate | 701/45 |
| 7,891,596 | B2 * | 2/2011 | Holbein et al. | 242/382.1 |
| 7,992,817 | B2 * | 8/2011 | Holbein et al. | 242/382.1 |

FOREIGN PATENT DOCUMENTS

| | | |
|---|---|---|
| JP | 2005-297781 | 10/2005 |
| JP | 2000-335368 | 12/2005 |
| JP | 2006-199116 | 8/2006 |
| JP | 2007-039011 | 2/2007 |

* cited by examiner

*Primary Examiner* — Sang Kim

(57) ABSTRACT

A retractor including a spindle for winding a seat belt; a frame for rotatably supporting the spindle; a winding spring for biasing the rotation of the spindle in the direction of winding the seat belt; and a magnetic disc and a magnet sensor unit for detecting the rotation of the spindle. The magnetic disc and the magnet sensor unit are disposed between the frame and the winding spring, and are each made of a magnetic material. Hence, the seat belt device can be less affected by a disturbance magnetic field and can detect the rotation of the spindle at high reliability.

5 Claims, 6 Drawing Sheets

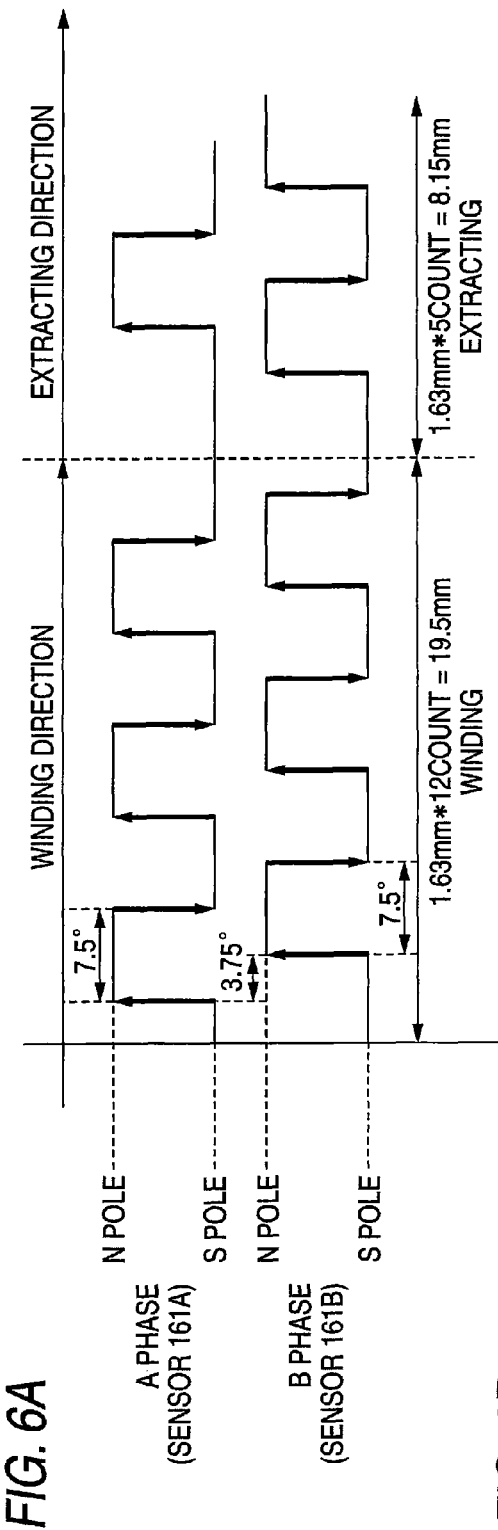

SEAT BELT DEVICE

CROSS REFERENCE TO RELATED APPLICATION

This application claims priority to International Application No. PCT/JP2008/055685, filed Mar. 26, 2008, which is based on and claims priority to Japanese Patent Application No. 2007-078109, filed Mar. 26, 2007.

FIELD OF THE INVENTION

The present invention relates to a seat belt device. More particularly, the present invention relates to a vehicle seat belt device in which rotation of a spindle of a retractor for winding a seat belt is detected, whereby the detected winding or extracting amount is used to control winding or extracting operation of the seat belt using an electric actuator.

BACKGROUND OF THE INVENTION

A seat belt device installed in a vehicle in which a seat belt (webbing) is wound and extracted using an electric actuator is known. In this kind of seat belt device, the extracting amount and winding amount of the seat belt are detected, and tension applied to the seat belt is adjusted so that the belt does not become loose or too tight while the vehicle is traveling. Usually, a rotation detection unit detects the rotation of the spindle of the retractor, thereby detecting the extracting amount and the winding amount of the seat belt. Thus, the rotation of the spindle is controlled in accordance with the extracting and winding amounts, as can be seen for example, in Patent document 1: Japanese Patent Unexamined Publication No. JP-A-2005-297781).

The seat belt device described in Patent document 1 has, as means for detecting the rotation of the spindle, a disc rotating in synchronization with a spindle and a permanent magnet and a magnetic sensor disposed so as to face opposite each other with the disc interposed therebetween. Transmitting sections for transmitting a magnetic field and shielding sections for shielding the magnetic field are provided alternately on the disc in the circumferential direction thereof, and the magnetic sensor detects the change in the magnetic field when the disc passes through between the permanent magnet and the magnetic field, thereby detecting the rotation of the spindle.

In the seat belt device described in Patent document 1, although the rotation of the spindle of the retractor is detected on the basis of the change in the magnetic field, if a disturbance magnetic field is applied to the rotation detection unit, there is a problem that the detection performance may be easily affected.

In consideration of the above-mentioned circumstances, an object of the present invention is to provide a seat belt device capable of being less affected by the disturbance magnetic field and capable of detecting the rotation of a spindle with high reliability.

SUMMARY OF THE INVENTION

The above-mentioned object of the present invention may be achieved through configurations described below.
(1) A seat belt device including:
 a spindle which winds a seat belt;
 a frame which rotatably supports the spindle and contains magnetic material;
 a biasing unit which biases the rotation of the spindle in a direction of winding the seat belt, and contains magnetic material; and
 a rotation detection unit which detects the rotation of the spindle,
 wherein the rotation detection unit is used to magnetically detect the rotation of the spindle and is disposed between the frame and the biasing unit.
(2) The seat belt device according to (1),
 wherein the rotation detection unit includes:
 a magnetic disc rotating together with the spindle; and
 a detection element which is disposed radially outside of the magnetic disc and converts a change in a magnetic field due to the rotation of the magnetic disc into an electrical signal.
(3) The seat belt device according to (1) or (2),
 wherein the biasing unit and the rotation detection unit are accommodated in a cover member that is dividable in an axial direction of the spindle, and
 wherein the cover member is installed on side plates of the frame.
(4) The seat belt device according to (3),
 wherein the biasing unit includes a winding spring, and
 wherein a partition wall, which separates respective accommodation spaces for the winding spring and the rotation detection unit, is provided inside the cover member.

With the seat belt device according to the present invention, since the rotation detection unit for magnetically detecting the rotation of the spindle is disposed between the biasing unit and the frame, and the biasing unit and the frame are made of magnetic materials, the rotation detection unit is less affected by a disturbance magnetic field due to the magnetic shielding effect of the magnetic materials, whereby the reliability of the rotation detection can be enhanced.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIGS. 6A to 6C are explanatory views showing the outputs of Hall ICs contained in the rotation detection unit;
FIG. 6A is a view showing the relationship between the output waveforms of two Hall ICs;
FIG. 6B is a view showing a condition in the case that the rotation direction of a spindle is a winding direction;
and FIG. 6C is a view showing a condition in the case that the rotation direction of the spindle is the winding direction.

DETAILED DESCRIPTION OF THE INVENTION

A seat belt device according to an embodiment of the present invention will be described below in detail with reference to the drawings.

Figure 1:
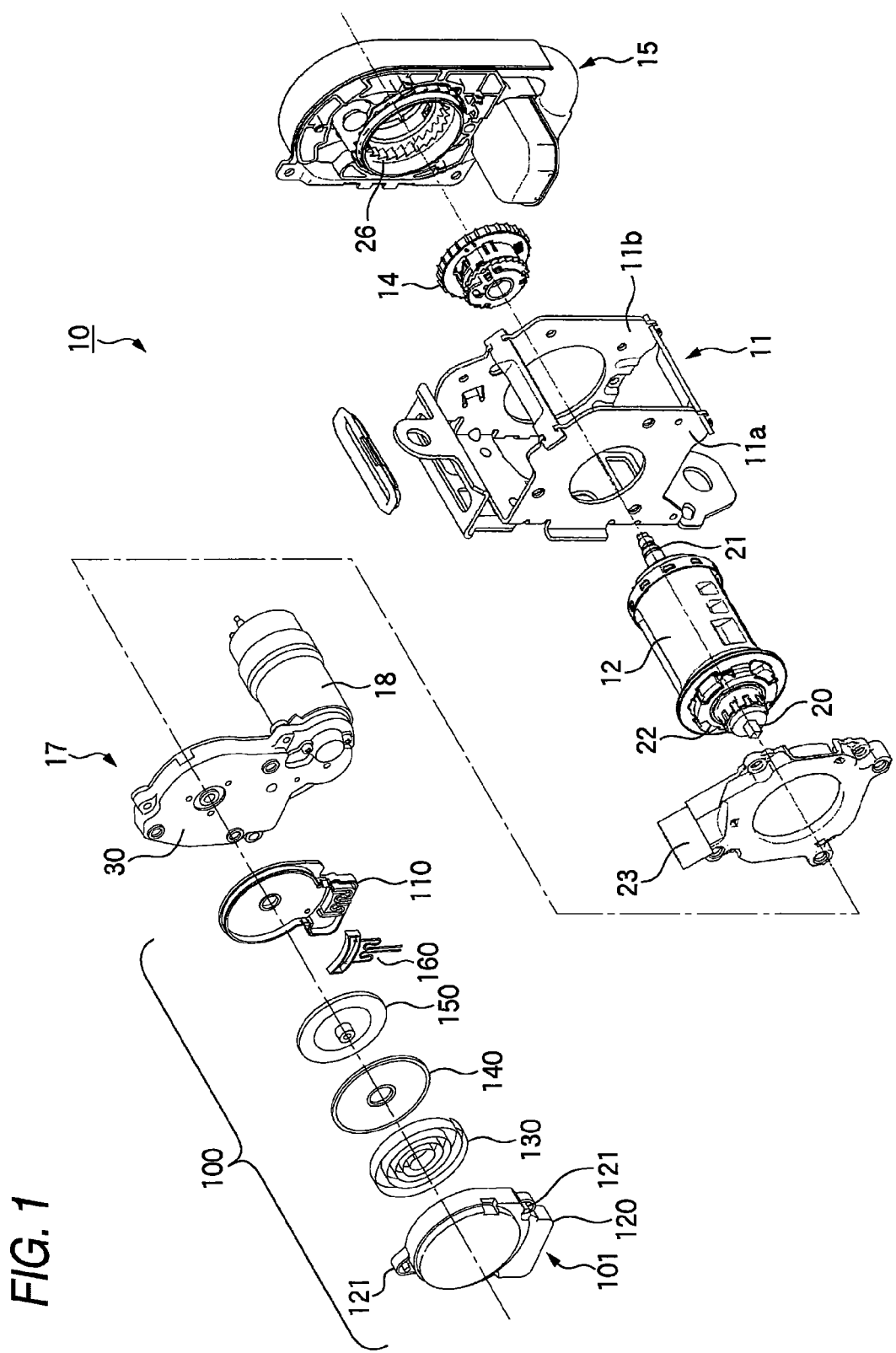
FIG. 1 is an exploded perspective view showing a seat belt device according to an embodiment of the present invention.

As shown in FIG. 1, a retractor 10, serving as a seat belt device according to one embodiment, includes a spindle 12 for winding a seat belt (not shown); a winding spring device 100 for biasing the rotation of the spindle 12 in the winding direction of the seat belt; a locking mechanism 14 for locking the extracting operation of the seat belt depending on acceleration detected using an acceleration sensor (not shown); an electric actuator 18 for generating power for rotating the spindle 12; a pretensioner mechanism 15 for generating other power for rotating the spindle 12; and a power transmission mechanism 17 capable of transmitting the power from the electric actuator 18 to the spindle 12.

Both ends of the spindle 12 are rotatably supported by left and right side plates 11a and 11b of a metallic support frame 11 used as a magnetic material (e.g., high-strength steel plate (SPFH590)).

A torque tube (not shown) constituting an energy absorbing mechanism is provided inside the spindle 12. One end side (the left end side in FIG. 1) of the torque tube is connected to the spindle 12 and the other end side (the right end side in FIG. 1) is connected to a tread head 21 to which the power from the pretensioner mechanism 15 is input.

The pretensioner mechanism 15 intensely pushes out balls (not shown) by virtue of a gas generated by igniting explosive, whereby the balls move along a groove in a pinion 26. The rotation of the pinion 26 is transmitted to the tread head 21, a torsion bar, and a spindle 12 via the locking mechanism 14. In addition, the power from the electric actuator 18 is also transmitted to a joint 22 provided on the spindle 12 via the power transmission mechanism 17. Numeral 23 in FIG. 1 designates a switch housing. A path switching gas generator (not shown) for switching a power transmitting passage from the pretensioner mechanism 15 by using the torsion bar is installed in the switch housing 23.

Figure 2:
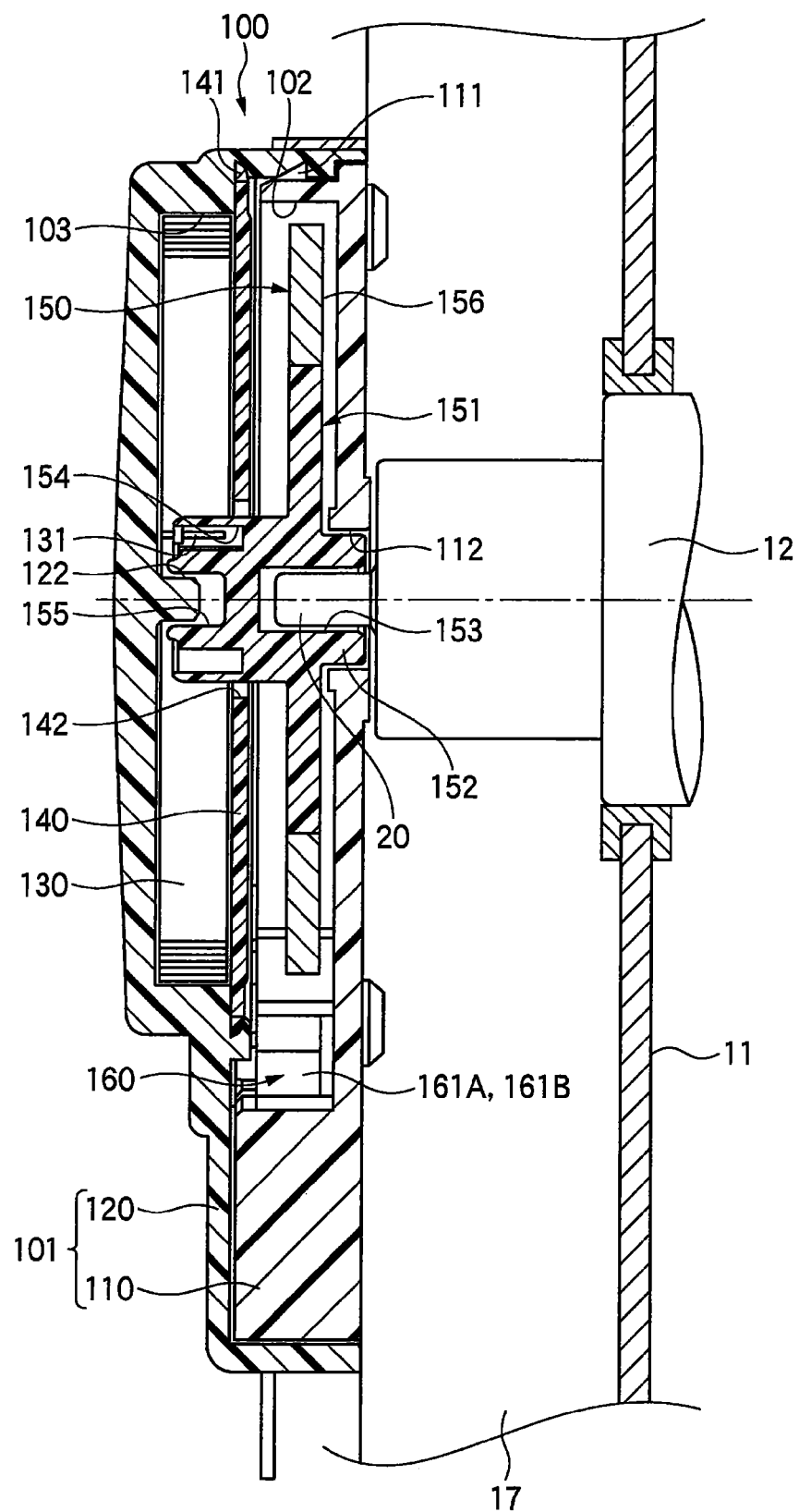
FIG. 2 is a side sectional view showing a winding spring device in the seat belt device of FIG. 1.

As shown in FIG. 2, the winding spring device 100 includes, inside the casing (cover member) 101 thereof, a metallic winding spring 130 made from a magnetic material (e.g., stainless steel) and serving as a biasing unit; a magnetic disc 150 and a magnet sensor unit 160 serving as a rotation detection unit for detecting the rotation of the spindle 12; and a shielding plate (partition wall) 140 made of resin (e.g., polyacetal or the like) for providing shielding between the magnetic disc 150 and the winding spring 130.

The casing 101 includes a lower cover 110 made of resin (e.g., polyacetal or the like) and an upper cover 120 made of resin (e.g., polypropylene or the like), halved in the axial direction of the spindle 12. The lower cover 110 and the upper cover 120 are joined to each other by engaging a pawl 111 of the lower cover 110 with the upper cover 120. Furthermore, an interior of the casing 101 is partitioned into a sensor accommodating space 102 and a spring accommodating space 103 by engaging a pawl 141 of the shielding plate 140 with the upper cover 120.

The winding spring 130 is accommodated inside the spring accommodating space 103 defined by the upper cover 120 and the shielding plate 140, and the magnetic disc 150 and the magnet sensor unit 160 are accommodated inside the sensor accommodating space 102 defined by the lower cover 110 and the shielding plate 140. With this configuration, the shielding plate 140 prevents interference of the winding spring 130 with the magnetic disc 150 and the magnet sensor unit 160, and the shielding plate 140 securely provides excellent slidability when the winding spring 130 operates. Thus, the shielding plate 140 prevents grease filled inside the spring accommodating space 103 and lubricating the winding spring 130 from entering the disc accommodating space 102.

In addition, the casing 101 is secured to the case 30 of the power transmission mechanism 17 at the engaging sections 121 provided on the upper cover 120 (see FIG. 1). Hence, the magnetic disc 150 and the magnet sensor unit 160 are disposed between the metallic support frame 11 and the metallic winding spring 130.

Furthermore, on the retainer section 151 of the magnetic disc 150, a boss 152 protruding at the center and on both sides thereof is provided, wherein one end side of the boss 152 is exposed from the central hole 112 of the lower cover 110. The magnetic disc 150 is rotated integrally with the spindle 12 by engaging the square-shaped end protrusion 20 of the spindle 12 with a square hole 153 formed in the end face of the boss 152 on the side of the lower cover 110.

Moreover, the other end side of the boss 152 protrudes from an opening 142 at the center of the shielding plate 140 toward the upper cover 120. An outer circumferential end of the winding spring 130 is secured to the upper cover 120, and an inner circumferential end 131 of the winding spring 130 is engaged with and secured to an engaging groove 154 provided on the other end side of the boss 152. With this configuration, the rotation biasing force of the winding spring 130 is transmitted to the spindle 12 via the retainer section 151 of the magnetic disc 150. Furthermore, a guide protrusion 122 is provided on the inner face of the upper cover 120, and the guide protrusion 122 is inserted into a guide hole 155 provided in the end face on the other end side of the boss 151 of the magnetic disc 150.

Figure 3:
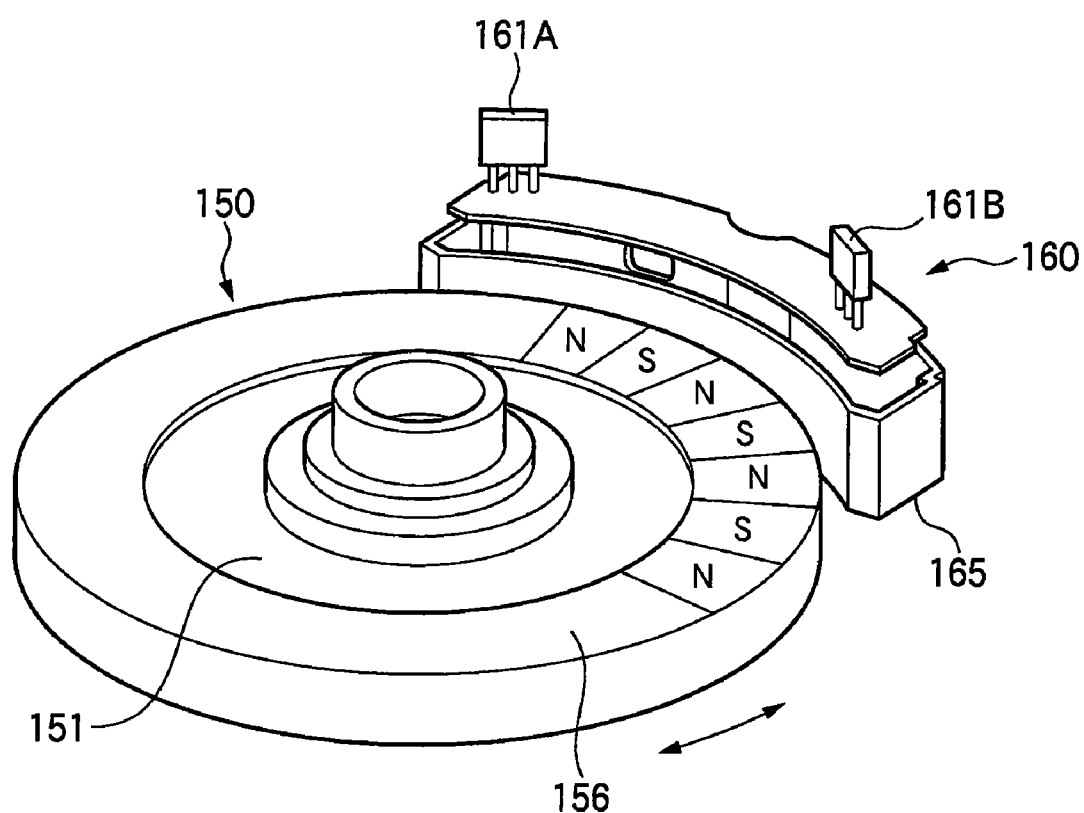
FIG. 3 is an exploded perspective view showing the major configuration of a rotation detection unit contained in the winding spring device of FIG. 2.
Figure 4B:
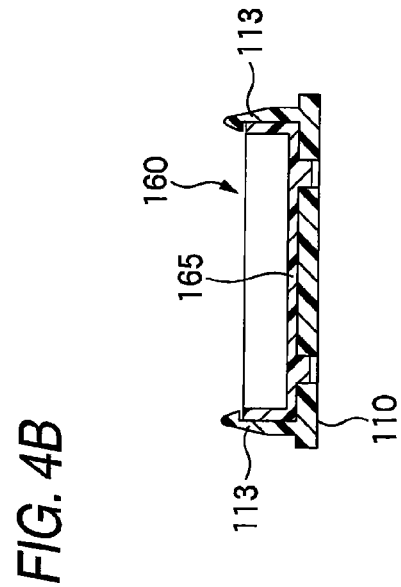
FIG. 4B is a sectional view taken on line IV-IV of FIG. 4A.
Figure 4A:
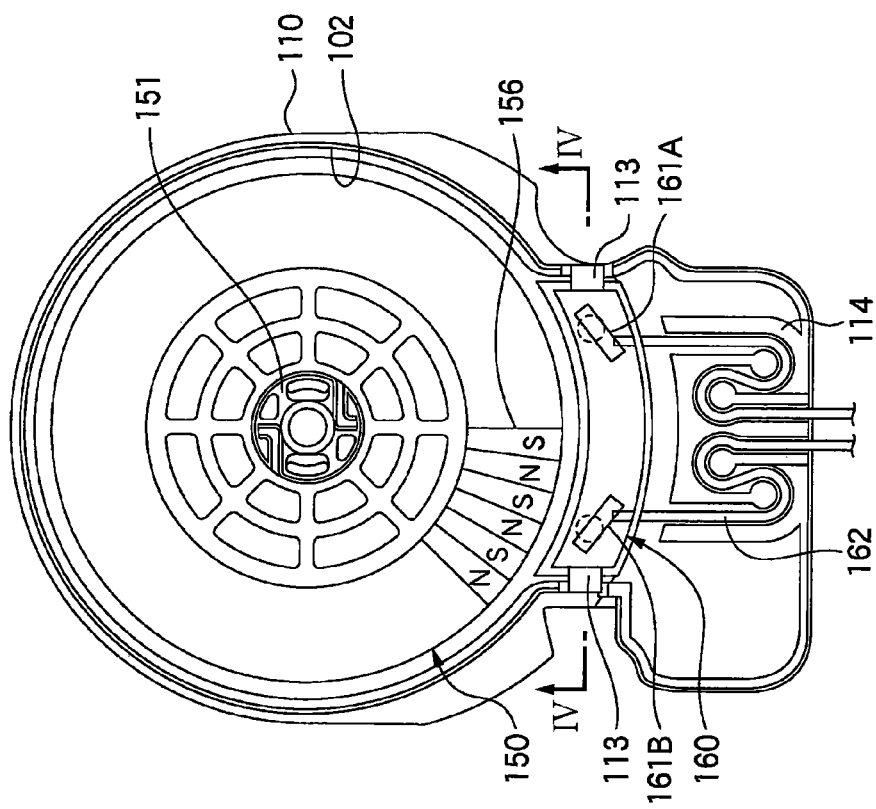
FIG. 4A is a plan view showing the internal configuration of the winding spring device.

A magnet 156 is disposed on the outer circumferential section of the magnetic disc 150, and the North (N) and South (S) poles of the magnet 156 are arranged at intervals of a constant pitch in the circumferential direction. The outer diameter of the magnetic disc 150 is smaller than an outer diameter of the winding spring. Furthermore, as shown in FIGS. 3 and 4, the magnet sensor unit 160 has two Hall ICs (detection elements) 161A and 161B that convert a change in magnetic field due to rotation of the magnetic disc 150 into an electrical signal and are arranged with a predetermined clearance therebetween. The magnet sensor unit 160 is accommodated inside the sensor housing 165 and disposed radially outside of the magnetic disc 150, and the sensor housing 165 is secured to the lower cover 110 with pawls 113. The lead wires 162 connected to the respective Hall ICs are taken outside from the lead wire extension section 114 provided on the lower cover 110.

Figure 5:
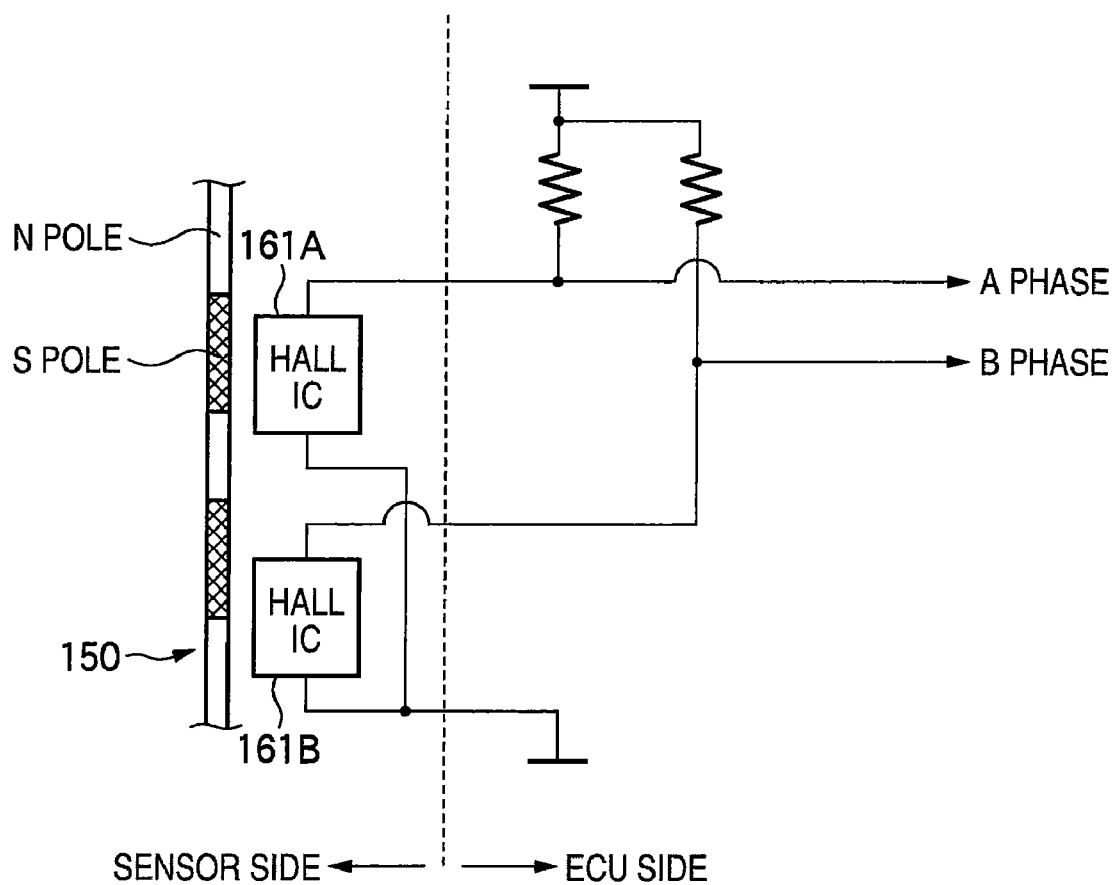
FIG. 5 is a principle configuration diagram of the rotation detection unit contained in the winding spring device.

FIG. 5 shows the relationship between the Hall ICs 161A and 161B and the magnetic poles of the magnetic disc 150. With this configuration, since the Hall ICs 161A and 161B generate outputs depending on the change in the magnetic flux due to the rotation of the magnetic disc 150, the rotation amount of the spindle 12 can be detected by counting the changes in the outputs of the Hall ICs 161A and 161B. In this case, as shown in FIG. 6A, the two Hall ICs 161A and 161B are disposed so that the changes in the current outputs due to the change in the magnetic field are shifted by a quarter-period phase with respect to each other.

Since 48 N and S poles (24 poles for each) are disposed alternately around the circumference (360°) of the magnetic disc 150, the angle for one pole is 7.5° (360°/48 poles=7.5°). Furthermore, since two-phase (one Hall IC 161A and one Hall IC 161B) detection is performed, the detectable resolution is 3.75° (=7.5°/2).

When the resolution (3.75°) is converted into the length of the belt at the time of the latching of the seat belt into a buckle (calculated assuming that the winding diameter of the belt is 50 mm), the resolution becomes 1.63 mm, whereby the movement length of the belt can be detected at a fairly high accuracy.

Also, since the two Hall ICs 161A and 161B are used, it is possible to detect the rotation direction of the spindle 12 using both outputs thereof. When the change shown in FIG. 6B is detected, it can be judged that the rotation is performed in the winding direction. On the other hand, when the change shown in FIG. 6C is detected, it can be judged that the rotation is performed in the extracting direction.

The extracting or winding operation of the belt can be controlled accurately depending on the traveling state of a vehicle by monitoring the extracting amount or the winding amount of the belt using the outputs of the magnet sensor unit 160 as described above.

According to the seat belt device of this embodiment, the rotation detection unit (the magnetic disc 150 and the magnet sensor unit 160) for magnetically detecting the rotation of the spindle 12 is disposed between the winding spring 130 and the frame 11, wherein the winding spring 130 and the frame 11 are formed so as to contain magnetic materials. As such, the rotation detection unit is less affected by a disturbance magnetic field due to the magnetic shielding effect of the magnetic materials, whereby the reliability of the rotation detection may be enhanced.

In addition, since the Hall ICs 161A and 161B are disposed radially outside of the magnetic disc 150, the dimension of the spindle in the axial direction thereof can be made compact.

Furthermore, since the winding spring 130 and the magnet sensor unit 160 are accommodated in the casing 101 that can be divided in the axial direction of the spindle 12 and these are sub-assembled as one unit, assembling can be completed by simply installing the unit on the side plate 11a of the frame 11 via the case 30 of the power transmission mechanism 17, thereby facilitating handling during the assembling process.

Moreover, since the shielding plate 140 for partitioning the respective accommodation spaces for the winding spring 130 and the rotation detection unit is provided inside the casing 101, it is possible to prevent physical interference between the winding spring 130 and the magnetic disc 150 and the magnet sensor unit 160, the magnetic disc 150 and the magnet sensor unit 160 serving as the rotation detection unit. Furthermore, the grease filled in the spring accommodating space 103 for the winding spring 130 can be prevented from entering the side of the rotation detection unit. Hence, the performance of the rotation detection unit is not impaired, and the rotation detection unit can deliver stable detection functions.

The present invention is not limited to the above-mentioned embodiment but can be modified and improved as necessary.

For instance, the biasing unit according to the present invention is not limited to the winding spring 130 according to the above-mentioned embodiment, as it may be a component that is used to bias the rotation of the spindle 12 in the winding direction of the seat belt and is formed so as to contain a magnetic material.

Moreover, the rotation detection unit is preferably provided as means for magnetically detecting the rotation of the spindle 12 and it should be understood to those of ordinary skill in the art that it is not limited to the above-mentioned embodiment.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

What is claimed is:

1. A seat belt device comprising:
a spindle for winding a seat belt;
a frame for rotatably supporting the spindle, the frame containing magnetic material;
a biasing unit for biasing rotation of the spindle in a winding direction of the seat belt, the biasing unit containing magnetic material;
a rotation detection unit for detecting rotation of the spindle; and
a cover member which accommodates the biasing unit and the rotation detection unit, the cover member is installed on side plates of the frame,
wherein the rotation detection unit comprises:
a magnetic disc rotating together with the spindle; and
N pole and S pole disposed alternately around an outer circumference of the magnetic disc at intervals of a constant pitch in a circumferential direction,
wherein the magnetic disc detects a change in a magnetic field due to the rotation of the magnetic disc in accordance with a rotation of the magnetic disc, and the magnetic disc is disposed between the frame and the biasing unit.

2. The seat belt device according to claim 1, wherein a partition wall, which separates respective accommodation spaces for the biasing member and the rotation detection unit, is provided inside the cover member.

3. The seat belt device according to claim 1, wherein the rotation detection unit further comprises a detection element which is disposed radially outside of the magnetic disc and converts the change in the magnetic field due to the rotation of the magnetic disc into the electrical signal.

4. The seat belt device according to claim 3, wherein an outer diameter of the outer circumference of the magnetic disc is smaller than an outer diameter of the biasing member.

5. The seat belt device according to claim 1, wherein the cover member is made of resin.

* * * * *